United States Patent
Jensen et al.

[11] Patent Number: 5,995,039
[45] Date of Patent: Nov. 30, 1999

[54] METHOD AND APPARATUS FOR PRECISE NONCOHERENT DOPPLER TRACKING OF A SPACECRAFT

[75] Inventors: James Robert Jensen; Robert Steven Bokulic, both of Columbia, Md.

[73] Assignee: The Johns Hopkins University, Baltimore, Md.

[21] Appl. No.: 09/066,516

[22] Filed: Apr. 24, 1998

Related U.S. Application Data

[63] Continuation-in-part of application No. 08/717,395, Sep. 20, 1996, Pat. No. 5,745,072.

[51] Int. Cl.⁶ .................................................. G01S 13/58
[52] U.S. Cl. ............................ 342/104; 342/115; 342/50; 342/46
[58] Field of Search ................... 342/104, 50, 46, 342/47, 48, 77, 115

[56] References Cited

U.S. PATENT DOCUMENTS

| | | | |
|---|---|---|---|
| 3,860,921 | 1/1975 | Wood | 342/109 |
| 4,060,809 | 11/1977 | Baghdady | 342/451 |
| 4,689,806 | 8/1987 | Von Der Embse | 375/111 |
| 4,785,463 | 11/1988 | Janc et al. | 375/1 |
| 5,187,805 | 2/1993 | Bertiger et al. | 455/12.1 |
| 5,594,454 | 1/1997 | Devereux et al. | 342/357 |
| 5,644,572 | 7/1997 | Olds et al. | 370/324 |
| 5,745,072 | 4/1998 | Jensen et al. | 342/104 |

*Primary Examiner*—John B. Sotomayor
*Attorney, Agent, or Firm*—Francis A. Cooch

[57] ABSTRACT

A method and apparatus are disclosed for making precise velocity measurements of a spacecraft using a two-way noncoherent Doppler tracking system. The received uplink and transmitted downlink frequencies on-board the spacecraft are compared with the resulting information being included in the downlink signal and used to cancel spacecraft oscillator drift rate effects in the two-way Doppler measurement made by the ground station. The information can also be used to characterize the drift rate of the spacecraft oscillator, thus permitting periods of accurate one-way Doppler tracking by the ground station. To improve accuracy, the times at which the measurements comprising the information would have been observed on the ground are inferred from the measurement of a signal generated by the spacecraft, e.g., the telemetry frame start times, made by the ground station.

23 Claims, 5 Drawing Sheets figure 1 figure 2 figure 3 figure 4 figure 5

METHOD AND APPARATUS FOR PRECISE NONCOHERENT DOPPLER TRACKING OF A SPACECRAFT

CROSS-REFERENCE TO RELATED APPLICATIONS

This application is a continuation-in-part of application Ser. No. 08/717,395, filed Sep. 20, 1996 now U.S. Pat. No. 5,745,072.

STATEMENT OF GOVERNMENTAL INTEREST

This invention was made with Government support under Contract No. N00039-95-C-0002 awarded by the Department of the Navy. The Government has certain rights in the invention.

BACKGROUND OF THE INVENTION

Since the first man-made satellites were flown in the late 1950s, navigation accuracy has been a fundamental performance parameter for space missions. Over the years, many techniques have been used for tracking spacecraft, with the most popular based upon measurement of the Doppler shift of the radio signals from the spacecraft. From observation of the Doppler shift profile of a spacecraft as it passes over a ground station, and from knowledge of the ground station location, the orbital elements of the spacecraft can be estimated.

The simplest radio navigation technique depends on one-way Doppler tracking using an on-board oscillator to produce a beacon that can be tracked from the ground. Early spacecraft depended on this approach. Often the beacon signal was modulated with data to provide for telemetry transmission as well. The ultimate accuracy of such one-way techniques, however, was limited by the stability of the on-board oscillator.

During the 1960s, the development of two-way coherent transponders virtually eliminated the oscillator stability problem because a highly accurate ground-based oscillator such as a hydrogen maser could be used as the frequency reference. Since their introduction, coherent transponders have been used in many spacecraft missions, with extensive ground station infrastructure built around their use. Examples include the Air Force Space-Ground Link Subsystem, the NASA Spaceflight Tracking and Data Network, and the NASA Deep Space Network (DSN).

(Note: Throughout the discussion herein, the subscripts "t" and "r" will refer to the signals transmitted and received by the ground station. The subscripts "u" and "d" will refer to the uplink and downlink signals at the spacecraft. The signals at the ground differ from those at the spacecraft due to the propagation time. All times will be referenced to a clock on the ground, even when the discussion deals with events taking place on the spacecraft.)

In a conventional two-way, coherent spacecraft navigation implementation, the ground station transmits a carrier with phase $$\phi_t(t) = 2\pi f_t t \tag{1}$$

where t is time and $f_t$ is the ground station transmit frequency. The transponder turnaround ratio is $\zeta$, so the phase of the carrier received on the ground from the spacecraft is $$\phi_r^{coh}(t) = \zeta \phi_t(t-\rho(t)) = 2\pi \zeta f_t [t-\rho(t)] \tag{2}$$

where $\rho(t)$ is the round-trip light time for a signal received at time t. This light time will depend on the spacecraft position (relative to the ground station) at the time of the transponder turnaround. This position will not, in general, be the position of the satellite at time t due a combination of satellite travel, Earth rotation, and movement of the Earth's center through space.

The ground station generates a reference signal based on the turnaround ratio and measures a Doppler phase that is the difference of this reference and the received phase. This Doppler phase is $$\phi_{Dop}^{coh}(t) = \zeta \phi_t(t) - \phi_r^{coh}(t) = 2\pi \zeta f_t \rho(t) \tag{3}$$

The change in the Doppler phase over some period of time is then related to the change in the round-trip light time as $$\Delta \phi_{Dop}^{coh}(t) = 2\pi \zeta f_t \Delta \rho(t) \tag{4}$$

This is the basic metric of coherent navigation. A change in the Doppler phase indicates a change in the round-trip light time, and therefore a change in the spacecraft position relative to the ground station.

While coherent tracking has proven very effective, it restricts the architecture choices for the communications hardware. Coherent transponders are typically heavy and expensive. The coherency requirement is a barrier to the renewed interest in simple transceiver-based communication systems that has been generated by the present-day emphasis on smaller, lower cost satellite missions.

For a noncoherent measurement, the phase of the signal transmitted by the spacecraft is not coherent with the uplink signal, but is a multiple, $\alpha$, of the spacecraft reference oscillator phase, $\phi_0(t)$. The phase received by the ground station is $$\phi_r^{non}(t) = \alpha \phi_0(t - \rho(t)/2) \tag{5}$$

where we have subtracted only the one-way light time from the argument of the phase reference because this phase has experienced only one-way travel.

Because we have a noncoherent system, the change in phase of the signal received on the ground will differ from what would occur with the use of a coherent system. This can result in an unacceptable error if the difference cannot be accurately removed from the measurement. Over the years, several noncoherent Doppler tracking techniques have been developed including one-way Doppler, difference Doppler, and two-way noncoherent Doppler using a subcarrier. These techniques either require highly stable oscillators (one-way Doppler), multiple ground stations (differenced Doppler), or changes to the ground station configuration (subcarrier tracking).

What is needed is a method and apparatus for two-way noncoherent navigation that provides cancellation of spacecraft oscillator drift effects and is compatible with existing ground station equipment. It must also provide accuracy equivalent to present-day two-way coherent systems (<0.1 mm/second).

SUMMARY OF THE INVENTION

The novel Telemetry Aided Doppler Tracking (TADT) method and apparatus of the invention overcomes the above difficulties by making one-way Doppler measurements in each direction (uplink and downlink), then using the uplink measurement to correct spacecraft oscillator drift effects in the downlink measurement. This correction is done on the ground using telemetry data from the spacecraft.

Figure 1:
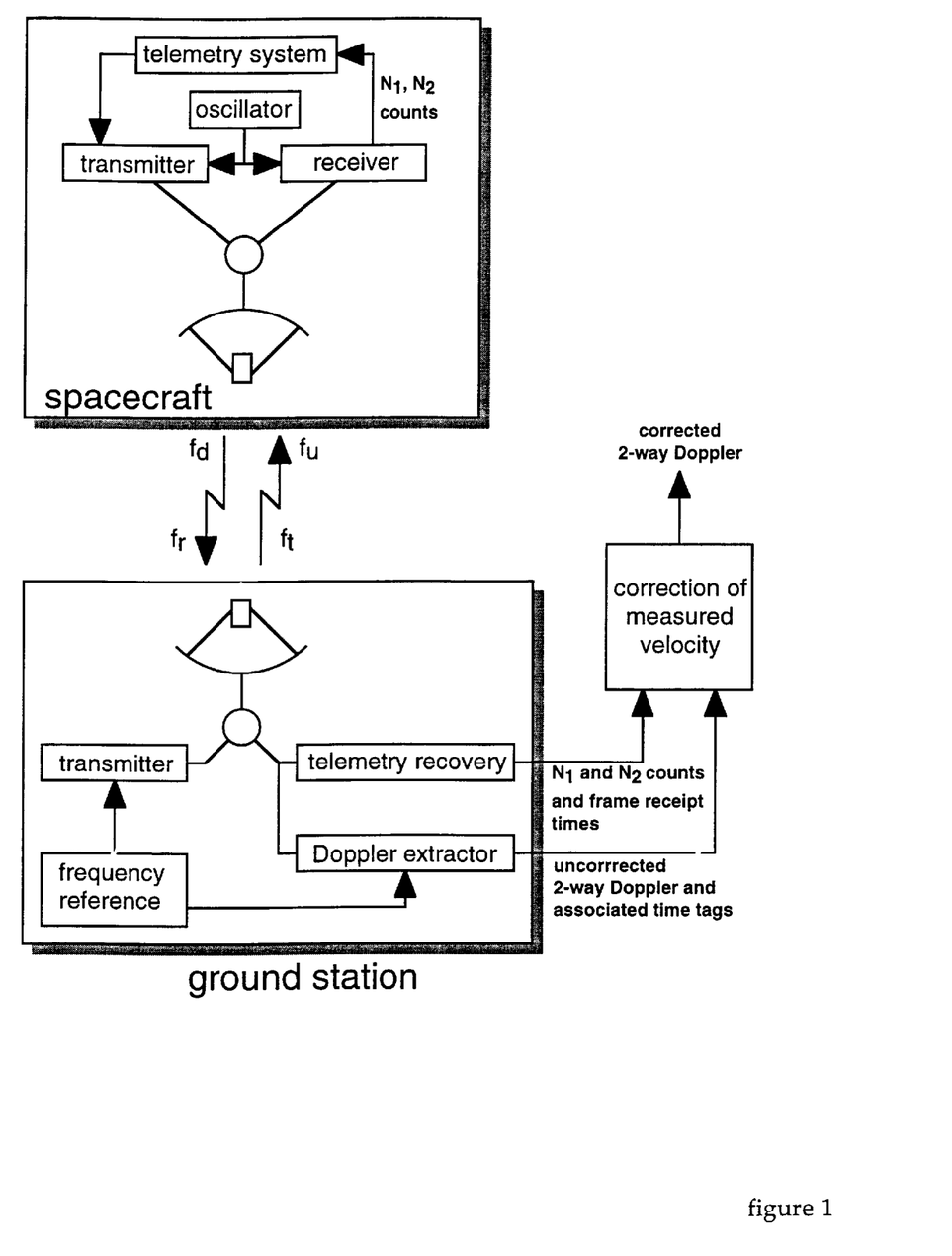
FIG. 1 illustrates the overall system concept that includes the invention for precise noncoherent Doppler tracking of a spacecraft.

FIG. 1 illustrates the TADT concept. The ground station performs two-way Doppler tracking as if there were a coherent transponder on-board the spacecraft. As the spacecraft travels over the ground station, its on-board receiver phase-locks to the uplink signal and downconverts it to a convenient frequency where it can be compared against the on-board oscillator. This comparison consists of a set of counter measurements that are telemetered to the ground. On the ground, the downlink signal is compared to the oscillator reference used to generate the uplink signal (typically an atomic standard) in a Doppler extraction process. The downlink measurement is then corrected through the use of the telemetered information in a post-processing software step that can be performed after the pass is over.

More specifically, the invention involves the addition of two counters to the spacecraft receiver. No impact is made upon the spacecraft transmitter, except that it must supply a pulse to the receiver that has a known relationship with the timing of each downlink telemetry frame.

The function of the counters is to compare the uplink frequency observed at the spacecraft with the on-board frequency reference used to generate the downlink signal. This measurement will be made in such a way that it allows for accurate time tagging of the resulting velocity measurement.

In the invention, the uplink carrier is downconverted in the receiver and used to provide a signal that is the clock of a first counter. A multiple of the frequency reference is used to provide the clock signal for a second counter. Both counters are reset to zero at the start of a given downlink telemetry frame and are free running thereafter.

Following the start of each telemetry frame, both counter values are latched using first and second latches on the next edge of the first counter. The latched values, $N_1$ and $N_2$, are put into the telemetry for use on the ground.

The above assumes that a common spacecraft frequency reference is used by the telemetry and the communications systems. When that is not the case, then the precise value of the second counter at the start of each frame is not exactly known. To provide the desired precise value, a third latch is used to latch the value of the second counter at the start of every telemetry frame and the resulting values are telemetered to the ground.

The invention has several noteworthy features. First, it is potentially as accurate as two-way coherent Doppler tracking, i.e., to the 0.1 mm/s level. Second, it is compatible with the existing hardware at typical ground stations. Third, a highly stable oscillator on the spacecraft is not required. Fourth, the on-board counters can be implemented with minimal impact to the spacecraft hardware. Fifth, the drift rate of the on-board oscillator can be determined with this technique, thus permitting periods of accurate one-way tracking for some missions. Sixth, turnaround phase noise is eliminated because one-way measurements are made instead of two-way measurements. Finally, with this technique, the effective "turnaround ratio" (downlink-to-uplink frequency ratio) can be readily changed from spacecraft to spacecraft. Thus, it permits the simultaneous tracking of multiple spacecraft with a common uplink signal.

Thus, TADT permits precise two-way, noncoherent Doppler tracking to be performed with simple transceiver-based communication systems. It has potential application to a variety of mission types including highly elliptical earth orbiters, lunar flights, libration point orbiters, deep space probes, and low-earth orbiters that do not carry a GPS receiver.

BRIEF DESCRIPTION OF THE DRAWINGS

FIG. 5, consisting of FIGS. 5a and 5b, illustrates, respectively, the experimental variations in the frequency reference for the zero velocity test, and the errors in the final, corrected velocity resulting from the application of the invention to the test data.

DETAILED DESCRIPTION OF THE INVENTION

The two-way, noncoherent Doppler tracking method of the invention is based on the idea that the uplink and downlink signals can be compared and time tagged within the spacecraft and this time tagged comparison information can be used to correct for spacecraft oscillator drift rate effects in the Doppler measurement made on the ground to determine the velocity of the spacecraft. A key aspect of the invention then is measuring, on-board the spacecraft, a time tagged set of values that are related, through known parameters, to the ratio of the change in phase of the signal received on the ground in a coherent system to the change in phase in a noncoherent system, and including this information within the spacecraft telemetry for use in precisely determining the spacecraft velocity on the ground.

Because we have a noncoherent system, the change in phase of the signal received on the ground will differ from what would occur with the use of a coherent system. The ratio of these two phase differences is $$q = \frac{\Delta\phi_r^{coh}(t)}{\Delta\phi_r^{non}(t)} = \frac{\zeta\Delta\phi_t(t-\rho(t))}{\alpha\Delta\phi_0(t-\rho(t)/2)} \tag{6}$$

The spacecraft is receiving the phase $\phi_t(t-\rho(t))$ at the instant that the spacecraft reference phase is $\phi_0(t-\rho(t)/2)$. If we provide a means of comparing changes in these two phases over some period of time, then we can use this result to relate the phase change measured on the ground from the noncoherent system to the phase change that would have been observed had a coherent system been employed. The counter hardware that is part of the TADT concept performs this comparison.

The change in the Doppler phase is measured by the ground station exactly as it would be for the coherent system. The result is $$\Delta\phi_{Dop}^{non}(t) = \zeta\Delta\phi_t(t) - \Delta\phi_r^{non}(t) \tag{7}$$

Given the ratio defined in Equation (6), we can express the change in the Doppler phase that would have been observed for a coherent system in terms of the change actually observed for a noncoherent system. Using the definitions of the change in the Doppler phase (Equation (3) for the coherent measurement and Equation (7) for the noncoherent measurement) and the definition of the ratio, q, in Equation (6), we obtain $$\Delta\phi_{Dop}^{coh}(t) = \zeta\Delta\phi_t(t) - q\Delta\phi_r^{coh}(t) \tag{8}$$

$$= q\Delta\phi_{Dop}^{non}(t) + [1-q]2\pi\zeta f_t \Delta t$$

Therefore, if we have the measured change in the Doppler phase as supplied by the ground station for the noncoherent system as computed by Equation (7), and if we have a measured value of the ratio q in Equation (6), then we can compute the change in the Doppler phase that would have resulted from the use of a coherent transponder through the linear relationship in Equation (8). No other aspects of the original navigation problem are affected by the use of a noncoherent system. The noncoherent navigation problem is therefore reduced to the measurement of the phase change ratio, q, over the appropriate time interval. The details of this measurement will be presented after a brief interpretation of the ratio and the accuracy required in its determination.

The accuracy of any satellite navigation technique will be affected by many factors, including the propagation of signals through the atmosphere and ionosphere. Only the additional errors that are introduced by the use of the TADT technique in place of a coherent transponder will be considered herein. The errors described below represent additional errors and not ultimate system performance. Furthermore, both the accuracy and the precision of the measurement are of interest. The accuracy will be limited by the ability to properly time tag the measurement while the precision will be limited by the randomness present in the measurement.

The precision of the velocity measurement will follow from the precision of the measurement of the ratio q. As an aid to the interpretation of this ratio, and as a means of establishing the precision required in its calculation, the Doppler phase differences can be converted into an equivalent range change, and therefore, an equivalent mean velocity. The result is $$\Delta\phi_{Dop}^{non}(t) = 2\pi\zeta f_t \Delta\rho^{non}(t) \qquad (9)$$

where $\Delta\rho^{non}(t)$ is the apparent change.

Substituting this and the analogous expression for the coherent system, Equation (4), into Equation (8) yields $$\Delta\rho(t) = q\Delta\rho^{non}(t) + [1-q]\Delta T \qquad (10)$$

where $\Delta T$ is the length of the measurement interval. As an aid to interpretation, the case of no acceleration of the distance between the spacecraft and the ground will be considered. The change in the round-trip light time is then $$\Delta\rho(t) = \frac{2v}{c}\Delta T \qquad (11)$$

where v is spacecraft velocity relative to the ground station, and c is the speed of light. Combining Equations (10) and (11), results in $$v = qv^{non} + [1-q]\frac{c}{2} \qquad (12)$$

where $v^{non}$ is the velocity that would be computed from the uncorrected Doppler phase.

From Equation (12) it can be seen that an error in the ratio, q, will produce a proportional error in the final computed velocity. For velocities of practical interest, the proportionality is $1.5\times10^8$ m/s. To achieve the velocity precision of 0.1 mm/s that is typical for a deep space mission for a 60-second integration time, a precision of $6.7\times10^{-13}$ in the determination of the ratio q will be required.

It will be shown that the invention can achieve a velocity measurement precision at this level without the requirement for a highly stable spacecraft oscillator. In contrast, one-way noncoherent navigation would require absolute oscillator stability at the $6.7\times10^{-13}$ level throughout the mission.

The noncoherent measurement concept of the invention involves the addition of first and second counters to the spacecraft receiver. No impact is made upon the spacecraft transmitter, except that it must supply a pulse to the receiver that has a known relationship with the timing of each downlink telemetry frame.

The function of the counters is to compare the uplink frequency observed at the spacecraft with the on-board frequency reference used to generate the downlink signal. It will be necessary to make this measurement in such a way that it allows accurate time tagging of the resulting velocity measurement.

Figure 2:
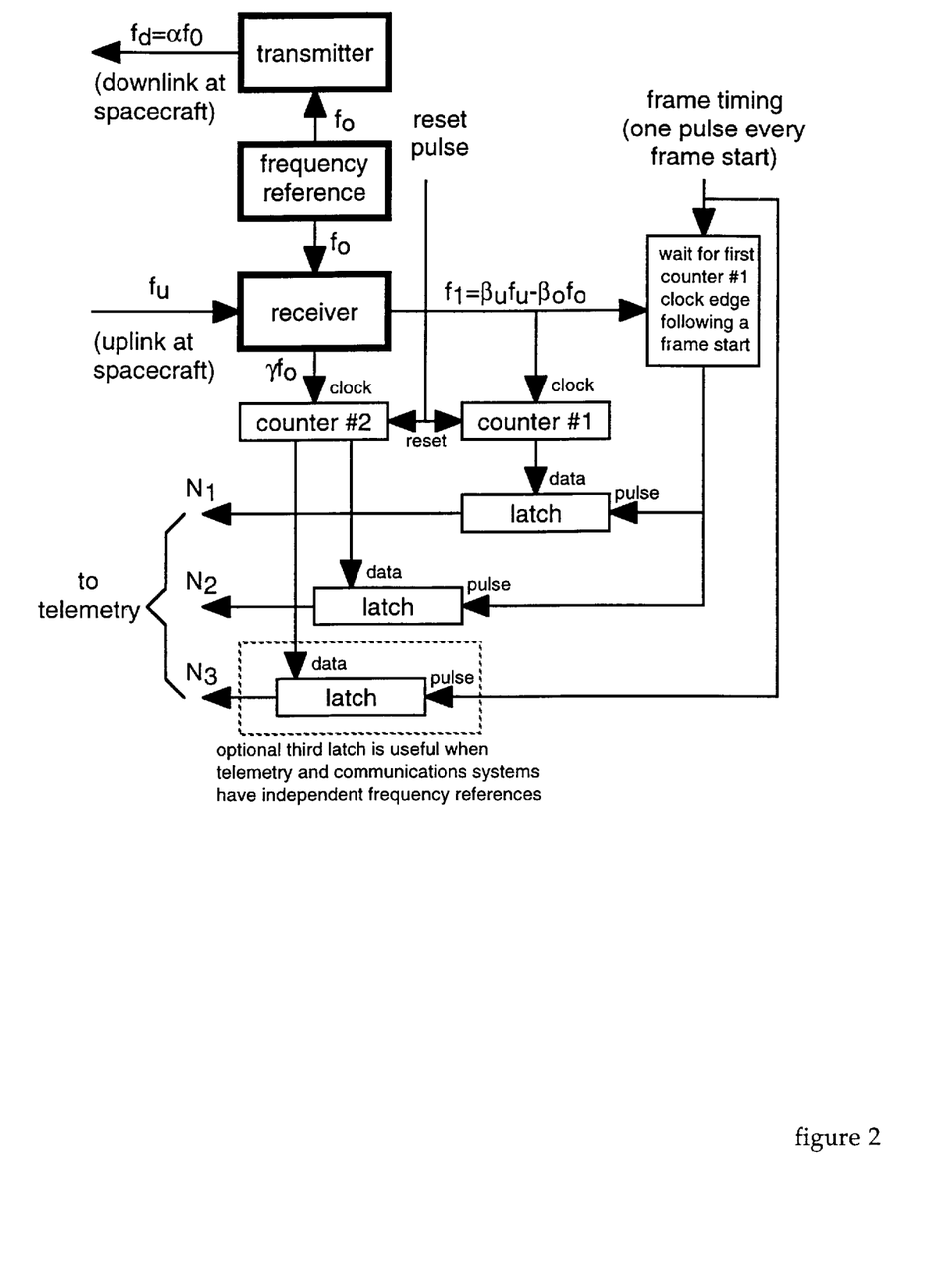
FIG. 2 is a block diagram illustrating a typical spacecraft hardware implementation of the invention.

A basic block diagram of a typical spacecraft hardware implementation of the invention is shown in FIG. 2. The uplink carrier is downconverted in the receiver and used to provide a signal, $f_1$, that is the clock of counter #1. A multiple of the frequency reference is used to provide the clock signal for counter #2. Both counters are reset to zero at the start of a selected (first) downlink telemetry frame. Both counters are free running thereafter through one or more succeeding downlink telemetry frames.

Following the start of each telemetry frame, both counter values are latched by first and second latches on the next edge of the counter #1 clock. The latched values, $N_1$ and $N_2$, comprise a time tagged set of measured values that comprise the number of zero-crossing counts and are put into the telemetry for use on the ground.

Suppose that the counter values are latched at two successive times $t_1$ and $t_2$. This implies that $$2\pi[N_1(t_2)-N_1(t_1)] = \phi_1(t_2)-\phi_1(t_1) = \beta_u[\phi_u(t_2)-\phi_u(t_1)] - \beta_o[\phi_o(t_2)-\phi_o(t_1)] \qquad (13)$$

where $N_1(t_1)$ and $N_1(t_2)$ are the counter #1 values at the two times, $\phi_1(t)$ is the phase of the counter #1 clock, in radians, at time t; $\phi_u(t)$ is the phase of the uplink carrier; and $\phi_0(t)$ is the phase of the frequency reference. $\beta_u$ and $\beta_o$ are constants that are characteristic of the receiver frequency plan. The values of counter #2 at the beginning and end of the measurement interval are $N_2(t_1)$ and $N_2(t_2)$ and the difference is $$2\pi[N_2(t_2)-N_2(t_1)] = \gamma[\phi_o(t_2)-\phi_o(t_1)] \qquad (14)$$

where $\gamma$ is a constant that relates the reference frequency to the counter #2 clock frequency. Combining Equations (13) and (14), results in $$\frac{\phi_u(t_2)-\phi_u(t_1)}{\phi_o(t_2)-\phi_o(t_1)} = \frac{1}{\beta_u}\left[\frac{\gamma[N_1(t_2)-N_1(t_1)]}{N_2(t_2)-N_2(t_1)} + \beta_o\right] \qquad (15)$$

Therefore, from the known values of $\beta_u$, $\beta_o$, and $\gamma$, which are determined by the hardware design, combined with the measured values of $N_1(t_1)$, $N_1(t_2)$, $N_2(t_1)$, and $N_2(t_2)$, the ratio of the number of uplink carrier cycles to the number of frequency reference cycles on the spacecraft can be computed.

Equation (15) is written in terms of the times at which events occur on the spacecraft. In terms of the times at which events are observed on the ground, we have $$\frac{\Delta\phi_t(t-\rho(t))}{\Delta\phi_o(t-\rho(t)/2)} = \frac{\Delta\phi_u(t-\rho(t)/2)}{\Delta\phi_o(t-\rho(t)/2)} = \frac{1}{\beta_u}\left[\frac{\gamma\Delta N_1(t-\rho(t)/2)}{\Delta N_2(t-\rho(t)/2)} + \beta_o\right] \quad (16)$$

This can be combined with the definition of the ratio, q, in Equation (6) to produce the final result $$q = \frac{\Delta\phi_r^{coh}(t)}{\Delta\phi_r^{non}(t)} = \frac{\zeta\Delta\phi_t(t-\rho(t))}{\alpha\Delta\phi_o(t-\rho(t)/2)} = \frac{\zeta}{\alpha\beta_u}\left[\frac{\gamma\Delta N_1(t-\rho(t)/2)}{\Delta N_2(t-\rho(t)/2)} + \beta_o\right] \quad (17)$$

Therefore, if the ground station observed the counter values being latched at time $t_1$ (this observation being delayed from the actual event by the one-way light time) and observed the counter values being latched again at time $t_2$, then the change in the phase of the downlink signal actually received between these two times can be related to the change in phase of the signal that would have been received from a coherent transponder. This is exactly true without any assumptions about the stability of the spacecraft frequency reference or about the spacecraft motion.

The only remaining problem to solve is that the ground station does not directly observe the events occurring on the spacecraft. The telemetry includes a set of measured values of $N_1$ and $N_2$, but the times at which these measurements would have been observed on the ground is not explicitly provided. These times will be inferred from the measurement of a signal generated by the spacecraft, e.g., the telemetry frame start times, made by the ground station.

The specific method of time tagging will depend on whether or not the frequency reference being used by the communications system is the same as that used by the telemetry system. Both cases are considered below.

Case 1. Telemetry Synchronous with the Downlink Carrier Signal

The first method of time tagging the noncoherent measurement is applicable when the telemetry frames have a fixed, known relationship with the phase of the downlink carrier signal. This will be the case when a common spacecraft frequency reference is used by the telemetry and the communications systems. The number of cycles of the frequency reference between the start of telemetry frames in this case is exactly known. The start of a given frame will provide the reset signal shown in FIG. 2. This frame may be the first to occur after an arming command is received, it may be the first to occur after a given time, or it may be defined in some other way. It will be necessary on the ground to know which frame corresponds to the resetting of the counters, but this will not be difficult to establish.

The time at which every frame is received on the ground will be measured with a frame synchronizer. Because one of the frames starts with both counters having a value of zero, and because the frames and the counter #2 clock are both synchronous with the spacecraft frequency reference, the value of counter #2 at the start of each succeeding frame is exactly known. Therefore, a set of times at which frames are received on the ground exists and the counter #2 values that existed at the moment that the frame was transmitted can be computed.

Assume that an interval $(T_1, T_2)$ over which the ground system has made a Doppler measurement is given. Using the measured frame start times and the knowledge of the synchronous relationship between the frame starts and the counter #2 clock, the values of $N_2$ that correspond to the beginning and the end of the ground measurement interval can be computed. These are the values of $N_2$ that would have been observed at the beginning and the end of the measurement interval if it was somehow possible to watch the values of counter #2 from the ground.

Given a value of $N_2$, the value of counter #1 that existed when counter #2 held the value $N_2$ can be determined. This can be done because there exists in the telemetry a set of $(N_1, N_2)$ pairs. Interpolating between the telemetered values of $N_2$ will determine a corresponding value $N_1$. This value will be denoted $N_1(N_2)$.

Equation (17) can therefore be rewritten as $$q = \frac{\phi_r^{coh}(T_2) - \phi_r^{coh}(T_1)}{\phi_r^{non}(T_2) - \phi_r^{non}(T_1)} = \frac{\zeta}{\alpha\beta_u}\left[\frac{\gamma[N_1(N_2(T_2)) - N_1(N_2(T_1))]}{N_2(T_2) - N_2(T_1)} + \beta_o\right] \quad (18)$$

where $T_1$ and $T_2$ may be any two desired times on the ground. This procedure meets all of the requirements for time tagging the phase difference measurement. Given this determined value of q, the change in the Doppler phase can be adjusted through Equation (8) or the velocity through Equation (12).

Case 2. Telemetry not Synchronous with Downlink Carrier Signal

If the telemetry and the communications systems have independent frequency references, then the precise value of counter #2 at the start of each frame is not exactly known. It is roughly known because the value of counter #2 is latched within one cycle of the counter #1 clock following the frame start. This uncertainty in the measurement time will introduce a time-tagging uncertainty of up to one period of the counter #1 clock. In the example implementation that will be discussed below, counter #1 is running at 5.3 kHz, so this represents an uncertainty of up to 190 $\mu$s. Depending on the velocity precision measurement requirements and the dynamics of the range to the spacecraft, such an uncertainty may, or may not be acceptable. If it is not acceptable, then a small modification to the hardware is required to achieve the desired measurement precision.

The modification consists of adding a third latch, which is included within the dotted line in FIG. 2. The value of counter #2 is latched at the start of every telemetry frame, both the first and each succeeding downlink telemetry frame, and telemetered to the ground. This provides the desired precise value of $N_2$ at the start of every telemetry frame. A small effective error results because of the digitization noise in reading counter #2 at the frame start. This time tagging error will be smaller than one period of the counter #2 clock (30 ns in the example below) and it will not be an important contributor. Therefore, the final measurement precision and accuracy are not degraded by the use of separate frequency references within the spacecraft.

The bit rate needed to support the TADT can be tailored to the needs and constraints of a given mission. The number of bits allocated to the $N_2$ value need never exceed that necessary to represent the ratio of the counter #2 clock frequency to the counter #1 clock frequency. This is true because the value of counter #2 at the telemetry frame start is known and the counter value is latched within one cycle of the counter #1 clock after this frame start. In the example below, this ratio is less than 6000, so 13 bits will suffice for the counter #2 value in each telemetry frame.

The number of bits needed for the $N_1$ values is set by the frame rate and the counter #1 clock rate. For a 1-second frame rate and a 5.3 kHz counter frequency, 13 bits per frame will be sufficient. In practice, this number of bits is conservative because the $N_1$ values will be predictable with even a coarse knowledge of the spacecraft velocity and will change little, if any, from frame to frame. A single reference value could be included in one frame with each frame containing a difference between the measured value for that frame and the reference value. This could reduce the number of bits required for the $N_1$ values to a few bits per frame.

For the example implementation, the required data rate is less than 20 bits per second in a low-Earth orbit where such a rate is easily supported. For deep space applications, the rate may be reduced to less than 1 bit per second by reducing the measurement rate from once each second to once each 30 seconds, while maintaining the accuracy and precision of the technique.

Spacecraft navigation is a complex process that requires not only extraction of the Doppler phase but consideration of the motion of the ground station through space, propagation time between the ground station and the spacecraft, atmospheric effects, etc. As noted above, only the additional errors that will result from the use of the TADT in place of a coherent transponder will be considered herein.

One source of error that is apparent from an examination of FIG. 2 is the digitization error that occurs in the latching of the counter #2 value. Other errors will result from the fact that the time tagging of the measurement involves interpolation between the frame synchronization times to obtain the necessary values of $N_2$ and interpolation of the telemetered values to obtain the necessary values of $N_1$. These two interpolations will be considered in turn. The digitization of the counter #2 value will enter into the interpolation error of $N_1$.

The error analysis will be performed under the assumption that the telemetry frames are synchronous with the frequency reference employed by the TADT hardware. The impact of using separate frequency references was discussed earlier.

The first step in the calculation of q is the determination of the values of $N_2$ that correspond to the beginning and the end of the measurement interval on the ground. $N_2$ is determined through a linear interpolation herein. This has been found to be sufficient for typical low-Earth and deep space applications. The computed values of $N_2$ will have two sources of error: errors in the measurement of the telemetry frame start times; and, deviations of $N_2(t)$ from a linear function. There is no contribution to the error due to the endpoint values of $N_2$ used to perform the interpolation because these values are exactly known at the time of the telemetry frame starts.

Given a ground time T, the value of $N_2(T)$ must be determined. The interpolated value will be denoted $\tilde{N}_2(T)$. It is computed as $$\tilde{N}_2(T; t_m, t_{m+1}) = N_2(t_m) + \frac{N_2(t_{m+1}) - N_2(t_m)}{t_{m+1} - t_m}(T - t_m) \quad (18)$$

where $t_m$ and $t_{m+1}$ are the ground receipt times of the two telemetry frames within which the interpolation is performed.

Errors in the determination of $N_2(T)$ can be treated as effective time tagging errors. If errors are made in the measurement of the frame receipt times, then the effective time error, $\delta T$, can be defined through the equation $$\tilde{N}_2(T, t_m + \epsilon_m, t_{m+1} + \epsilon_{m+1}) = N_2(T + \delta T) \quad (19)$$

where $\epsilon_m$ and $\epsilon_{m+1}$ are the errors in the time tagging of $t_m$ and $t_{m+1}$. The magnitudes of $\epsilon_m$ and $\epsilon_{m+1}$ are determined by the frame synchronization hardware.

The effective time error can be found to be $$\delta T = \qquad (20)$$
$$-\frac{t_{m+1} - T}{t_{m+1} - t_m}\varepsilon_m - \frac{T - t_m}{t_{m+1} - t_m}\varepsilon_{m+1} + \frac{(T - t_m)(T - t_{m+1})}{2}\left[\left(\frac{a}{c}\right) - \left(\frac{\dot{f}_0}{f_0}\right)\right]$$

where $\dot{f}_0$ is the drift rate of the spacecraft oscillator and a is the acceleration in the spacecraft range from the ground station at time T. The first two terms on the right hand side of Equation (20) represent the direct effects of the frame synchronization errors while the last term represents the effects of $N_2(t)$ being a nonlinear function of time. The statistics of this error can be determined by assuming that T is uniformly probable on the interval $\{t_m, t_{m+1}\}$.

An error in the effective measurement time will be made at both the beginning and the end of the measurement interval. These errors will be denoted $\delta T_1$ and $\delta T_2$. These may be converted to an error in the final, corrected velocity as $$\delta v = \frac{1}{2}\left[\frac{\overline{v} - v(T_1)}{\Delta T} + c\frac{\overline{f}_0 - f_0(T_1)}{\overline{f}_0 \Delta T}\right]\delta T_1 + \qquad (21)$$
$$\frac{1}{2}\left[\frac{v(T_2) - \overline{v}}{\Delta T} + c\frac{f_0(T_2) - \overline{f}_0}{\overline{f}_0 \Delta T}\right]\delta T_2$$

where $\overline{v}$ is the mean velocity and $\overline{f}_0$ is the mean reference frequency over the measurement interval. The values of $\delta T_1$ and $\delta T_2$ may be correlated (positively or negatively). Simulations have shown this correlation to be significant when the frame time tagging is coarse and the measurement interval is small. Such correlation will exist in the low-earth orbit example to be presented below.

The velocity error that results from the interpolation of $N_2$, as expressed by Equation (21), does not involve any of the details of the on-board hardware. It results only from the precision with which the telemetry frame start times are measured and from changes in the spacecraft velocity and frequency reference.

To illustrate the error contributions due to the interpolation of $N_2$, a frame synchronization error of $\pm 100$ $\mu$s can be considered. For a deep space mission in which exists a maximum acceleration of only 0.034 m/s$^2$ due to the rotation of the Earth, the velocity error will be only 0.0017 mm/s. (Note that $\overline{v} - v(T_1) = v(T_1) - \overline{v} = a\Delta T/2$ for the case of constant acceleration.) On the other hand, a low-earth orbiting satellite may present an acceleration of 100 m/s$^2$ and produce a velocity error of 5 mm/s. This is sufficient for most LEO satellites. A frequency drift of less than $3\times10^{-9}$ s$^{-1}$ will produce a velocity error less than 0.045 mm/s for either case. Oscillator stability better than the $10^{-9}$ s$^{-1}$ level is readily available with the use of off-the-shelf crystal oscillators.

If a higher order interpolation is used on the calculation of $N_2$, then the form of Equation (20) will change. Equation (21) will remain applicable, however.

We have in the telemetry a set of $(N_1, N_2)$ pairs. Given a value of $N_2(T)$ determined by the interpolation discussed above, the corresponding value of $N_1$ must be determined through a polynomial interpolation. The computed values of $N_1$ will have two sources of error: errors in the $N_2$ values contained in the telemetry; and, deviations of $N_1(N_2)$ from the target polynomial. The errors in the $N_2$ values result from the fact that these are quantized and have an error that is uniformly distributed on the interval (0,1). The function $N_1(N_2)$ contains high order terms that arise from the round-trip light time, $\rho(t)$, and from drift in the spacecraft oscillator.

If $N_1$ is determined through a Kth order interpolation, the error in the interpolated value of $N_1$ at each end of the measurement interval will be $$\delta N_1 = \frac{f_1}{f_2} \sum_{k=0}^{K} \delta N_2(t_{m+k}) \prod_{n \neq k} \frac{(T - t_{m+n})}{(t_{m+k} - t_{m+n})} + \frac{f_2^{(K+1)}}{(K+1)!} \left( \frac{d^{(K+1)}}{d N_2^{(K+1)}} N_1(N_2) \right) \prod_{n=0}^{K} (T - t_{m+n}) \quad (22)$$

where $\delta N_2(t_m)$ is the error in the telemetered value of $N_2(t_m)$ due to the digitization error in reading counter #2, and $t_m, t_{m+1}, \ldots, t_{m+K}$, are the frame start times for the $N_2$ values within which the interpolation is being performed. The approximation $N_2(t) \approx f_2 t$ has been used in writing the above expression to simplify its application.

The first part of Equation (22) simply represents a weighted sum of the digitization errors in $N_2$ values. The maximum value of this error will be $f_1/f_2$ since the limit on $\delta N_2$ is 1. Other statistics of the digitization error can be obtained by assuming that T is uniformly distributed within the central region of the interpolation interval.

Equation (22) is a general expression. Its specific application requires an evaluation of derivatives of $N_1$ with respect to $N_2$ for a given order of interpolation. A third order interpolation will be considered here. It is found that $$\frac{d^4}{d N_2^4} N_1(N_2) = \frac{\beta_u f_u}{c f_2^4} \left\{ -r^{(4)} + 6r^{(3)} \frac{\dot{f}_0}{f_0} - 15a \left( \frac{\dot{f}_0}{f_0} \right)^2 - 15(c - v) \left( \frac{\dot{f}_0}{f_0} \right)^3 \right\} \quad (23)$$

where $r^{(3)}$ and $r^{(4)}$ are the third and fourth time derivatives of the spacecraft range. Second and third order time derivatives of the spacecraft reference frequency have been ignored in Equation (23).

Regardless of the interpolation order, the velocity error that results from an error in $N_1$ is $$\delta v \approx \pm \frac{c}{2 \beta_u f_t \Delta T} \delta N_1 \quad (24)$$

where the ± sign depends on whether the error exists at the beginning (+) or the end (−) of the measurement interval. Equations (22) through (24) provide a general means of evaluating the velocity precision of the measurement. As was the case for the $N_2$ interpolation, the errors at the two ends of the measurement interval may be correlated, especially when the measurement interval is small.

One source of error is of particular interest for the choice of counter frequencies employed by the on-board hardware. This is the quantization error in the measurement of $N_2$. Because $\Delta N_2$ has a digitization error bounded by ±1, we can combine Equations (22) and (24) to produce a bound on the velocity error resulting from the quantization of $N_2$ as $$|\delta v| < \frac{c f_1}{2 \beta_u f_t f_2 \Delta T} \quad (25)$$

For a fixed value of $\Delta T$, this error is minimized by making the ratio $f_1/\beta_u f_t$ small and the value of $f_2$ large. Minimizing $f_1/\beta_u f_t$ is accomplished by translating the uplink frequency to a low value within the receiver. This increases the sensitivity of the counter #1 clock frequency to the Doppler shift. Dividing the clock frequency to a low value does not improve the accuracy. Maximizing the value of $f_2$ is accomplished by running counter #2 at the maximum practical rate. The evaluation of Equation (25) is the first step in the consideration of a specific implementation of the Telemetry Aided Doppler Tracking technique since this source of error limits the final precision. It is independent of spacecraft dynamics, oscillator stability, and frame synchronization precision.

Figure 3:
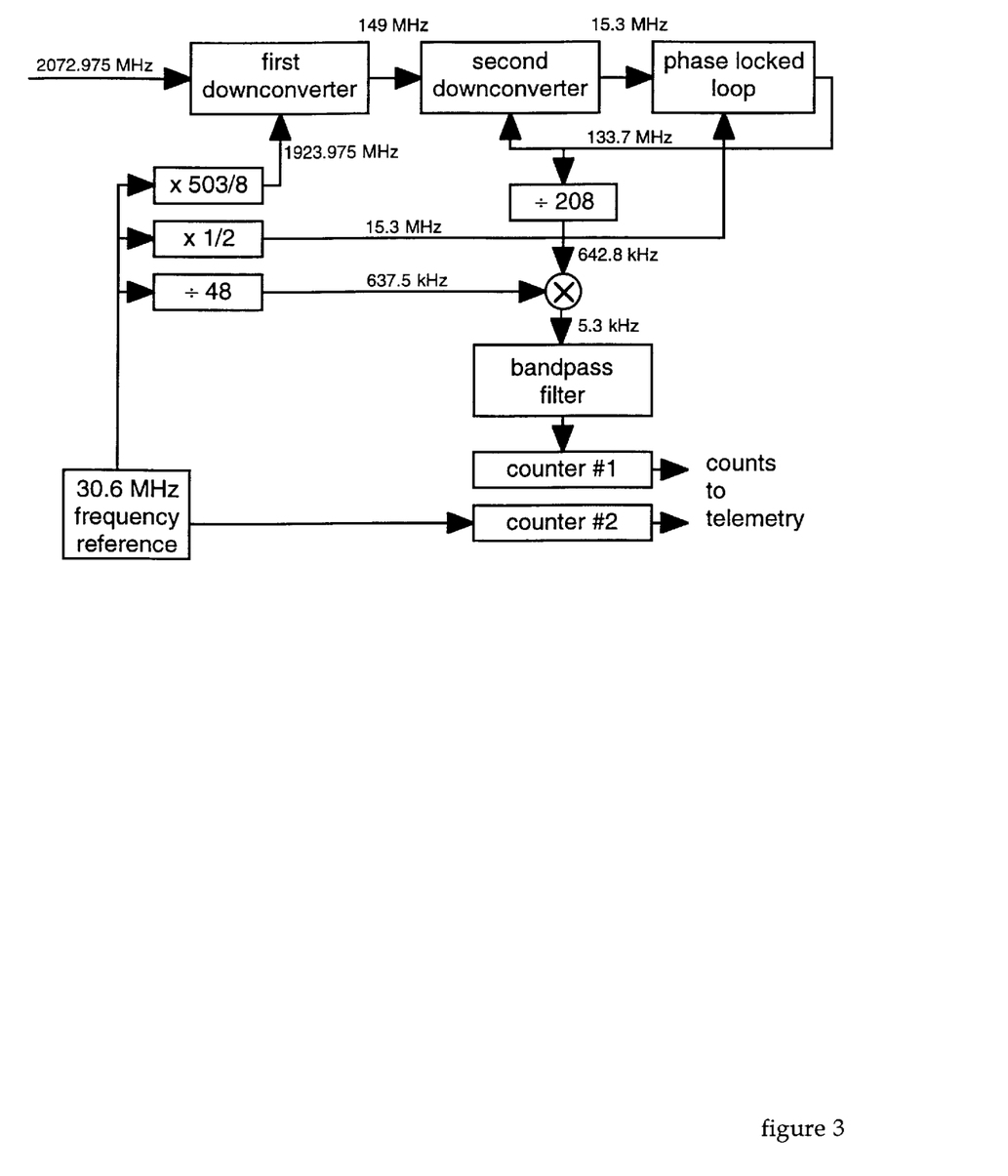
FIG. 3 illustrates a block diagram for a hardware prototype of the invention and a related frequency plan.

The Telemetry Aided Doppler Tracking technique of the invention will be demonstrated on a satellite that will be launched in mid 2000 in a 625 km altitude Earth orbit. A prototype of the hardware to be used on this mission has been assembled and tested. A simplified block diagram of the prototype hardware is shown in FIG. 3. Corresponding numerical values for the parameters defined in FIG. 2 are contained in Table 1.

TABLE 1

| parameter | variable | value |
| --- | --- | --- |
| ground transmit frequency | $f_t$ | 2072.975 MHz |
| nominal downlink frequency | $f_d, f_r$ | ≈2250 MHz |
| spacecraft frequency reference | $f_0$ | 30.6 MHz |
| nominal counter 1 frequency | $f_1$ | 5.3 kHz |
| counter 2 frequency | $f_2$ | 30.6 MHz |
| reference oscillator cycles per telemetry frame | — | $2^{25}$ |
| telemetry frame interval | — | 1.09655 s |
| downlink multiplier | $\alpha$ | 1250/17 |
| downconversion multiplier | $\beta_u$ | 1/208 |
| IF multiplier | $\beta_0$ | 125/384 |
| counter 2 multiplier | $\gamma$ | 1 |
| coherent multiplier | $\zeta$ | 240/221 |
| frame time tagging precision | — | ±100 µs |
| on-board oscillator drift rate | $\dot{f}_o/f_o$ | $3 \times 10^{-9}$ s$^{-1}$ |
| LEO orbit altitude | — | 625 km |
| measurement start | $T_1$ | 0 ± 0.5 s |
| measurement stop | $T_2$ | $T_1$ + 60 s (deep space) $T_1$ + 1 s (LEO) |

Numerical simulations have been performed for a deep space mission and for the 625 km altitude Earth orbit. For each situation, 4000 trials were conducted with each trial being a repetition of the same segment of the satellite pass. Each trial involves choosing a random start time for the first telemetry frame (uniform over a 1-second interval), a random value of the spacecraft frequency reference (uniform over a 5 kHz interval), and a random value of the phase of the counter #1 clock at the start of the first telemetry frame (uniform over one cycle). The simulated ground and spacecraft measurements all include the appropriate propagation delays for transmission of the radio signals.

In the simulations, the measurement of the telemetry frame time is made with a resolution of 200 µs. The spacecraft frequency reference has a constant relative drift rate ($\dot{f}_o/f_o$) Of $3 \times 10^{-9}$ s$^{-1}$. The Doppler measurement made on the ground starts within 1 second of the moment that the spacecraft is directly over the ground station. At this point, the acceleration and the acceleration induced errors are maximized.

Table 2 shows the simulation results using the prototype design shown in FIG. 3 with a drift rate of $3 \times 10^{-9}$ s$^{-1}$ in the spacecraft frequency reference for a deep space mission.

TABLE 2

|  | min (mm/s) | max (mm/s) | std dev (mm/s) |
|---|---|---|---|
| simulation | −0.078 | 0.072 | 0.023 |
| prediction total | −0.102 | 0.102 | 0.022 |
| $N_2$ interpolation at start | −0.023 | 0.023 | 0.011 |
| $N_2$ interpolation at end | −0.023 | 0.023 | 0.011 |
| $N_1$ interpolation at start | −0.006 | 0.050 | 0.011 |
| $N_1$ interpolation at end | −0.050 | 0.006 | 0.011 |

In this case, the rotation of the Earth dominates the dynamics of the range between the ground station and the spacecraft. The Doppler measurement interval is 60 seconds long. The table includes the extremes in the observed error within the 4000 trials, as well as the standard deviation of the error. It is seen in Table 2 that the accuracy and precision goals of 0.1 mm/s are met with this hardware. Also shown in Table 2 are the predicted minimum, maximum, and standard deviation of the velocity errors based on the analysis described earlier. The simulated results agree well with the predicted errors. A breakdown of the predicted errors is also included in the last four lines of the table.

Table 3 shows the simulation results involving 4000 trials using the prototype hardware with a drift rate of $3 \times 10^{-9}$ s$^{-1}$ in the spacecraft frequency reference in the 625 km altitude low-Earth orbit. The last four lines of the table are a breakdown of the prediction total. The prediction total does not include the impact of a correlation of the error sources that is present in the simulation.

TABLE 3

|  | min (mm/s) | max (mm/s) | std dev (mm/s) |
|---|---|---|---|
| simulation | −5.59 | 5.27 | 1.66 |
| prediction total | −7.07 | 7.07 | 1.56 |
| $N_2$ interpolation at start | −1.83 | 1.83 | 0.86 |
| $N_2$ interpolation at end | −1.83 | 1.83 | 0.86 |
| $N_1$ interpolation at start | −0.75 | 2.66 | 0.69 |
| $N_1$ interpolation at end | −2.66 | 0.75 | 0.69 |

The Doppler measurement interval is 1 second long for this case. The precision and accuracy for this case are in the 1–10 mm/s range. In this case, the spacecraft motion dominates the dynamics. Again, the error predictions agree well with the simulation results. Achieving a precision of 0.1 mm/s for the prototype hardware in the low-Earth orbit is possible, but it requires measurement of the telemetry frame times with a 1 μs precision. In practice, such precision is not usually required for a low earth orbiting satellite.

Figure 4:
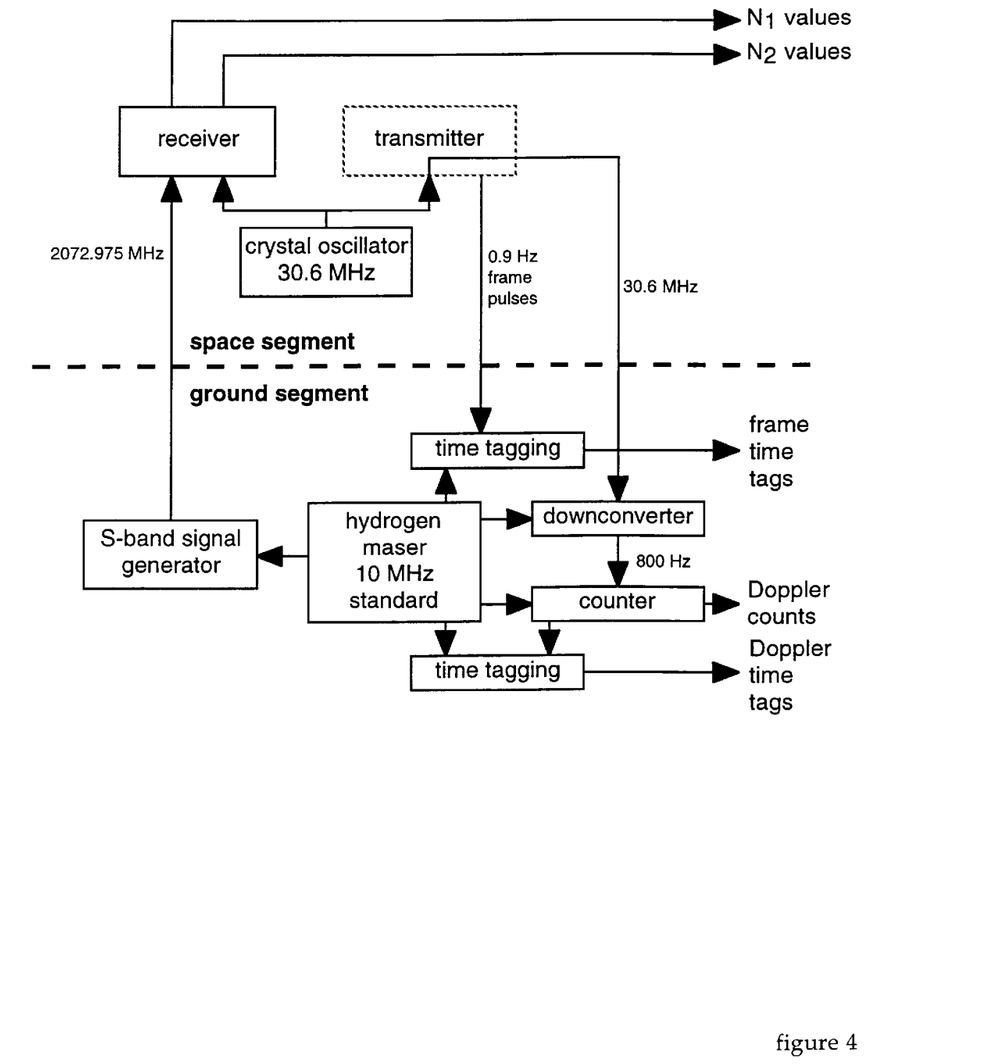
FIG. 4 is a block diagram of the zero velocity measurement test setup of the prototype shown in FIG. 3.

The receiver shown in FIG. 3 was assembled and tested to verify the basic accuracy of the TADT technique. The test setup is shown in FIG. 4. This "zero velocity" measurement was done in the laboratory by injecting a fixed-frequency signal into the RF input, then recording the $N_1$ and $N_2$ values over time. The RF input signal was derived from a hydrogen maser signal standard.

This setup mimicked the actual Doppler tracking of a satellite by incorporating hardware to accomplish the transmission of an uplink signal and the reception and Doppler processing of the downlink signal. Actual downlink transmitter hardware was not available, so the 30.6 MHz oscillator was used directly as the downlink signal. The results are equal to what would have been obtained for a 2 GHz downlink.

Figure 5:
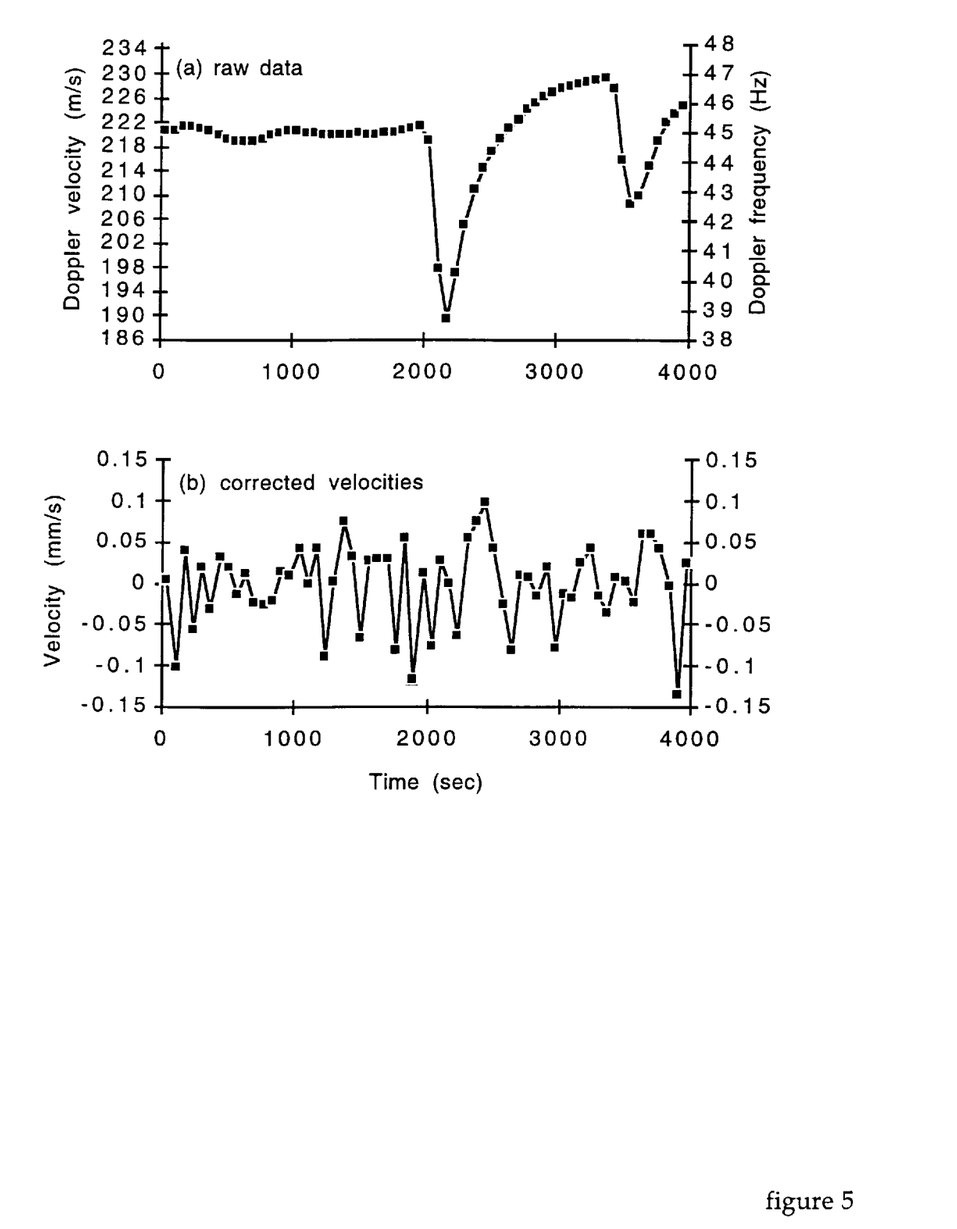

FIG. 5a shows the difference between the on-board oscillator frequency and its nominal value of 30.6 MHz for a one-hour interval. The two large drops in the frequency at about 2000 and 3200 seconds into the data were caused by manually inducing a temperature fluctuation in the oscillator. The scale on the right of FIG. 5a indicates the measured frequency itself while the scale on the left shows the two-way Doppler velocity to which these frequencies correspond. The two-way Doppler velocity is seen to vary over a range of about 40 m/s.

FIG. 5b shows the error in the two-way, noncoherent velocity that resulted from processing the recorded $N_1$ and $N_2$ values. The rms value of the error is 0.05 mm/s with excursions that were within ±0.13 mm/s. The on-board extraction technique has thus reduced the errors by a factor of more than $10^5$. Repeated experiments have produced comparable results.

A highly accurate, two-way noncoherent navigation technique has been demonstrated through analysis, numerical simulation, and laboratory experiments. It operates in conjunction with existing ground station assets configured to produce conventional two-way Doppler phase measurements. Timing of the noncoherent measurement is not a problem so long as the telemetry frame receipt time is measured accurately. Time tagging accuracy at the level of 100 μs is sufficient for both deep space and low-Earth orbiting applications. A highly stable oscillator is not required as the frequency reference on the spacecraft. Oscillator drift rates better than $3 \times 10^{-9}$ s$^{-1}$ are sufficient to meet a measurement accuracy of 0.1 mm/s.

We claim:

1. A method for determining the velocity of a spacecraft during two-way noncoherent Doppler tracking comprising the steps of:

comparing, on-board the spacecraft, a frequency of a downlink signal and a frequency of an uplink signal, the downlink signal frequency being noncoherent with the uplink signal frequency, to obtain information about the comparison;

including the comparison information in the downlink signal to a ground station;

time tagging the comparison information by relating the comparison information to a signal generated by the spacecraft, the signal being observable by the ground station; and determining the velocity of the spacecraft using the time tagged comparison information to correct a two-way Doppler measurement made by the ground station.

2. The method as recited in claim 1, wherein the signal generated by the spacecraft used to time tag the comparison information is the start time of each telemetry frame in the downlink signal.

3. The method as recited in claim 2, the determining step comprising the steps of:

measuring the start time of each downlink telemetry frame received by the ground station;

computing at the ground station the comparison information at the spacecraft for the time interval of the two-way Doppler measurement made by the ground station using the comparison information received by the ground station, the measured downlink telemetry frame start times, and the relationship between the comparison information and the start time of each telemetry frame in the downlink signal; and using the computed comparison information at the spacecraft and the time interval at the ground station to correct the two-way Doppler measurement made by the ground station.

4. The method as recited in claim 2, the determining step comprising the steps of:

measuring the start time of each downlink telemetry frame received by the ground station;

computing at the ground station the time interval for the comparison information received by the ground station during the two-way Doppler measurement made by the ground station using the comparison information received by the ground station, the measured downlink telemetry frame start times, and the relationship between the comparison information and the start time of each telemetry frame in the downlink signal; and using the computed time interval and the comparison information received by the ground station to correct the two-way Doppler measurement made by the ground station.

5. The method as recited in claims 3 or 4, further comprising the step of including information about the relationship between the comparison information and the start time of each telemetry frame in the downlink signal.

6. A method for determining the velocity of a spacecraft during two-way noncoherent Doppler tracking comprising the steps of:

measuring, on-board the spacecraft, a set of values related to a ratio of an uplink signal frequency received by the spacecraft to a downlink signal frequency transmitted by the spacecraft, the downlink signal frequency being noncoherent with the uplink signal frequency;

including the measured set of values in the spacecraft telemetry to a ground station;

time tagging the measured set of values by relating the measured set of values to a signal generated by the spacecraft, the signal being observable by the ground station; and determining the velocity of the spacecraft using the measured time tagged set of values to correct for spacecraft oscillator drift rate effects in the two-way Doppler measurement made by the ground station.

7. The method as recited in claim 6, wherein the signal generated by the spacecraft used to time tag the measured set of values is the start time of each telemetry frame in the spacecraft telemetry.

8. The method as recited in claim 7, the determining step comprising the steps of:

measuring the start time of each downlink telemetry frame received by the ground station;

computing at the ground station the measured set of values at the spacecraft for the time interval of the two-way Doppler measurement made by the ground station using the measured set of values received by the ground station, the measured downlink telemetry frame start times, and the relationship between the measured set of values and the start time of each telemetry frame in the spacecraft telemetry; and using the computed measured set of values at the spacecraft and the time interval at the ground station to correct the two-way Doppler measurement made by the ground station.

9. The method as recited in claim 7, the determining step comprising the steps of:

measuring the start time of each downlink telemetry frame received by the ground station;

computing at the ground station the time interval for the measured set of values received by the ground station during the two-way Doppler measurement made by the ground station using the measured set of values received by the ground station, the measured downlink telemetry frame start times, and the relationship between the measured set of values and the start time of each telemetry frame in the downlink signal; and using the computed time interval and the measured set of values received by the ground station to correct the two-way Doppler measurement made by the ground station.

10. The method as recited in claims 8 or 9, further comprising the step of including information about the relationship between the measured set of values and the start time of each downlink telemetry frame in the spacecraft telemetry.

11. The method as recited in claim 7, wherein the measured set of values comprise a number of zero-crossing counts of a frequency reference, the frequency reference being related to the downlink signal frequency, and a number of zero-crossing counts of the uplink signal frequency, the number of zero-crossing counts for both the reference frequency and the uplink signal frequency being determined by the time period beginning with the start of a downlink telemetry frame and ending on the next edge of the uplink signal frequency.

12. The method as recited in claim 11, the determining step comprising the steps of:

measuring the start time of each downlink telemetry frame received by the ground station;

computing at the ground station the measured set of values at the spacecraft for the time interval of the two-way Doppler measurement made by the ground station using the measured set of values received by the ground station, the measured downlink telemetry frame start times, and the relationship between the measured set of values and the start time of each telemetry frame in the spacecraft telemetry; and using the computed measured set of values at the spacecraft and the time interval at the ground station to correct the two-way Doppler measurement made by the ground station.

13. The method as recited in claim 11, the determining step comprising the steps of:

measuring the start time of each downlink telemetry frame received by the ground station;

computing at the ground station the time interval for the measured set of values received by the ground station during the two-way Doppler measurement made by the ground station using the measured set of values received by the ground station, the measured downlink telemetry frame start times, and the relationship between the measured set of values and the start time of each telemetry frame in the downlink signal; and using the computed time interval and the measured set of values received by the ground station to correct the two-way Doppler measurement made by the ground station.

14. The method as recited in claims 12 or 13, further comprising the step of including information about the relationship between the measured set of values and the start time of each downlink telemetry frame in the spacecraft telemetry.

15. The method as recited in claims 8 or 9, the measuring a set of values step comprising the steps of:

counting the number of zero-crossings of the uplink signal frequency, the uplink signal frequency having been previously downconverted, during a period of time beginning with the start of a downlink telemetry frame and ending on the next edge of the uplink signal frequency; and counting the number of zero-crossings of a frequency reference, the frequency reference being related to the downlink signal frequency, during the same period of time as the uplink signal frequency counting;

wherein the number of zero-crossings of the uplink signal frequency and the number of zero-crossings of the frequency reference comprise the measured set of values.

16. The method as recited in claim 10, the measuring a set of values step comprising the steps of:

counting, using a first counter, the number of zero-crossings of the uplink signal frequency, the uplink signal frequency having been first downconverted, the first counter being reset to zero at the start of a first downlink telemetry frame and being free running thereafter through one or more succeeding downlink telemetry frames;

counting, using a second counter, the number of zero-crossings of a frequency reference, the second counter being reset to zero at the start of the first downlink telemetry frame and being free running thereafter through one or more succeeding downlink telemetry frames;

supplying a pulse to reset the first and second counters to zero at the start of the first downlink telemetry frame and to indicate the start of each succeeding downlink telemetry frame;

latching the first counter, using a first latch, on the next edge of the uplink signal frequency following the start of each of the first and succeeding downlink telemetry frames; and latching the second counter, using a second latch, on the next edge of the uplink signal frequency following the start of each of the first and succeeding downlink telemetry frames;

wherein the first and second counters, upon being latched after the first downlink telemetry frame and each succeeding downlink telemetry frame, each produce a latched value, the latched values comprising the measured set of values.

17. The method as recited in claim 16, the information including step comprising the step of latching the second counter, using a third latch, at the start of the first downlink telemetry frame and each succeeding downlink telemetry frame to provide a set of latched values, the set of latched values being included in the spacecraft telemetry to the ground station.

18. The method as recited in claim 17, wherein the second counter uses a multiple of the frequency reference as a clock signal.

19. A method for determining the velocity of a spacecraft during one-way noncoherent Doppler tracking comprising the steps of:

measuring, on-board the spacecraft, a set of values related to a ratio of an uplink signal frequency received by the spacecraft to a downlink signal frequency generated by an on-board oscillator and transmitted by the spacecraft, the downlink signal frequency being non-coherent with the uplink signal frequency;

including the measured set of values in the spacecraft telemetry to a ground station;

time tagging the measured set of values by relating the measured set of values to a signal generated by the spacecraft, the signal being observable by the ground station;

inferring the on-board oscillator frequency from the measured time tagged set of values and a two-way Doppler measurement made by the ground station;

repeating the measuring, including, time tagging and inferring steps to produce a series of on-board oscillator frequency inferences;

determining an inferred on-board oscillator drift rate using the series of on-board oscillator frequency inferences; and during one-way Doppler tracking by the ground station, determining the velocity of the spacecraft using the inferred on-board oscillator drift rate.

20. The method as recited in claim 19, wherein the signal generated by the spacecraft used to time tag the measured set of values is the start time of each telemetry frame in the spacecraft telemetry.

21. Apparatus on-board a spacecraft for providing a set of measured values for comparing an uplink signal frequency received at the spacecraft with a frequency reference used to generate a downlink signal frequency by the spacecraft, the set of measured values being included in the spacecraft telemetry to a ground station for use in determining the velocity of the spacecraft during two-way noncoherent Doppler tracking, the apparatus comprising:

a first counter, the first counter using as a clock signal the uplink signal frequency, the uplink signal frequency having been first downconverted, the first counter being reset to zero at the start of a first downlink telemetry frame and being free running thereafter through one or more succeeding downlink telemetry frames;

a second counter, the second counter using as a clock signal the frequency reference, the second counter being reset to zero at the start of the first downlink telemetry frame and being free running thereafter through one or more succeeding downlink telemetry frames;

means for supplying a pulse to reset the first and second counters to zero at the start of the first downlink telemetry frame and to indicate the start of each succeeding downlink telemetry frame;

a first latch for latching the first counter on the next edge of the first counter clock signal following the start of each of the first and succeeding downlink telemetry frames; and a second latch for latching the second counter on the next edge of the first counter clock signal following the start of each of the first and succeeding downlink telemetry frames;

wherein the first and second counters, upon being latched after the first downlink telemetry frame and each succeeding downlink telemetry frame, each produce a latched value, the latched values comprising the set of measured values.

22. The apparatus as recited in claim 21, further comprising a third latch for latching the second counter at the start of the first downlink telemetry frame and each succeeding downlink telemetry frame to provide a set of latched values, the set of latched values being included in the spacecraft telemetry to the ground station.

23. The apparatus as recited in claims 21 or 22, wherein the second counter uses a multiple of the frequency reference as a clock signal.

* * * * *